(12) United States Patent
Lampazzi et al.

(10) Patent No.: US 9,938,010 B2
(45) Date of Patent: Apr. 10, 2018

(54) HUMAN MACHINE INTERFACE SYSTEM

(71) Applicant: Sikorsky Aircraft Corporation, Stratford, CT (US)

(72) Inventors: Margaret MacIsaac Lampazzi, Oxford, CT (US); Thomas Guido, Stormville, NY (US); Gary Howland, Stratford, CT (US); Luca F. Bertuccelli, West Hartford, CT (US); Robert Pupalaikis, Palm Beach Gardens, FL (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 14/957,067

(22) Filed: Dec. 2, 2015

(65) Prior Publication Data

US 2016/0152336 A1    Jun. 2, 2016

Related U.S. Application Data

(60) Provisional application No. 62/086,403, filed on Dec. 2, 2014.

(51) Int. Cl.
*B64C 39/02* (2006.01)
*B64D 45/08* (2006.01)
(Continued)

(52) U.S. Cl.
CPC ............ *B64C 39/024* (2013.01); *B64D 45/08* (2013.01); *G01C 23/00* (2013.01); *G05D 1/0038* (2013.01);
(Continued)

(58) Field of Classification Search
None
See application file for complete search history.

(56) References Cited

U.S. PATENT DOCUMENTS 8,713,215 B2    4/2014  Wade
8,924,044 B1 *  12/2014 Wang ................ G05D 1/0022
                                           340/961
(Continued)

FOREIGN PATENT DOCUMENTS

WO        2013139509 A1    9/2013

OTHER PUBLICATIONS

European Search Report; EP Application No. 15197296.5; dated Apr. 26, 2016; 10 pages.
(Continued)

*Primary Examiner* — Lail A Kleinman
(74) *Attorney, Agent, or Firm* — Cantor Colburn LLP

(57) ABSTRACT

An electronic human machine interface (HMI) module is configured to receive at least one input from an operator of a manually-operated vehicle. The electronic HMI module includes an electronic graphical display unit and an electronic control module. The electronic graphical display unit is configured to display information corresponding to the manually-operated vehicle and information corresponding to an autonomously operated unmanned vehicle (UV) located remotely from the manually-operated vehicle. The electronic control module is in signal communication with the UV and is configured to receive an electronic image signal from the UV. The electronic control module is further configured to display a real-time image captured by the UV on the electronic graphical display unit based on the image signal.

15 Claims, 3 Drawing Sheets

(51) Int. Cl.
*G05D 1/00* (2006.01)
*G08G 5/00* (2006.01)
*G01C 23/00* (2006.01)

(52) U.S. Cl.
CPC ......... *G05D 1/0094* (2013.01); *G08G 5/0021* (2013.01); *B64C 2201/123* (2013.01); *B64C 2201/127* (2013.01); *B64C 2201/141* (2013.01); *G08G 5/0008* (2013.01); *G08G 5/0069* (2013.01)

(56) References Cited

U.S. PATENT DOCUMENTS

| | | | |
|---|---|---|---|
| 9,115,995 B1* | 8/2015 | Owen | G01C 23/00 |
| 2010/0084513 A1* | 4/2010 | Gariepy | B64C 39/024 244/190 |
| 2010/0198514 A1 | 8/2010 | Miralles | |
| 2011/0187563 A1 | 8/2011 | Sanders-Reed | |
| 2011/0208373 A1* | 8/2011 | Lees | B64C 39/024 701/2 |
| 2013/0076540 A1 | 3/2013 | McLoughlin et al. | |

OTHER PUBLICATIONS

Hawkins, Kari: "Unmanned aircraft soar with new capabilities for Apache team" Oct. 6, 2014, 1pg.
McCaney, Kevin: "Army gives Apache pilots control over UAVs, Defense Systems"; Oct. 9, 2014, 15 pps.
Sticha, et al. "Identifying Critical Manned-Unmanned Teaming Skills for Unmanned Aircraft System Operators" Sep. 1, 2012, 65pgs.

* cited by examiner

HUMAN MACHINE INTERFACE SYSTEM

CROSS-REFERENCE TO RELATED APPLICATIONS

This patent application claims priority to U.S. Provisional Patent Application Ser. No. 62/086,403, filed Dec. 2, 2014, which is incorporated herein by reference in its entirety.

TECHNICAL FIELD

The invention relates generally to vehicle interfaces, and more particularly, to an interface system that electrically communicates a manually-operated vehicle with an autonomous unmanned vehicle.

BACKGROUND

The battlefield awareness of manually-operated vehicle crew members has been traditionally limited by the design of the cockpit, the sounds heard by the crew members, and the line of sight of existing aircraft sensors, such as a Forward Looking Infrared (FLIR) sensor, installed on the manually-operated vehicle. Therefore, cockpit crew members are constantly burdened with a lack of situational awareness regarding the battlefield area or other points of interest. In the case of manually-operated aircraft vehicles, the lack of situational awareness is of increased concern in areas of interest such as, for example, intended landing/evacuation zones. Conventional methods of improving the cockpit crew's situational awareness rely on external radio communication and situational reports provided by from ground personnel. Moreover, ground personnel are typically located an excessive distance away from the point of interest of the manually-operated vehicle to ensure their safety. Consequently, the conventional methods of addressing situation awareness can result in limited, outdated, and/or inaccurate information.

SUMMARY

According to embodiment, an electronic human machine interface (HMI) module is configured to receive at least one input from an operator of a manually-operated vehicle. The electronic HMI module includes an electronic graphical display unit and an electronic control module. The electronic graphical display unit is configured to display information corresponding to the manually-operated vehicle and information corresponding to an autonomously operated unmanned vehicle (UV) located remotely from the manually-operated vehicle. The electronic control module is in signal communication with the UV and is configured to receive an electronic image signal from the UV. The electronic control module is further configured to display a real-time image captured by the UV on the electronic graphical display unit based on the image signal In addition to one or more of the features described above or below, or as an alternative, further embodiments include:

a feature where the electronic control module determines a handover communication session between the manually-operated vehicle and the UV, and selectively operates the electronic graphical display unit in a first mode and a second mode during the handover communication session;

a feature where the graphical display unit displays an interface of selectable actions to control operation of the manually-operated vehicle and the UV when operating in the first mode, and wherein the graphical display unit displays real-time image captured by the UV when operating in the second mode;

a feature where the interface of selectable actions include a first set of selectable actions to control at least one of the handover communication session and navigation of the UV, and a second set of selectable action to control operation of at least one UV image sensor installed on the UV;

a feature where the electronic control module outputs an autonomous operation control signal that commands the UV to traverse to a geographical point of interest while simultaneously transmitting the image signal to the electronic control module;

a feature where the UV automatically initiates at least one image sensor to capture the real-time image in response to establishing the handover communication session and a feature where the electronic control module receives an input commanding at least one UV sensor to selectively output the image signal as one of an infrared image signal or a video signal.

According to another embodiment, a method of visually enhancing a geographical point of interest using a human machine interface (HMI) system comprises establishing a handover communication session to electrically communicate at least one electrical signal between a manually-operated vehicle and an autonomously operated unmanned vehicle (UV) located remotely from the manually-operated vehicle. The method further comprises automatically navigating the UV to a point of interest designated using an electronic HMI module installed on the manually-operated vehicle. The method further comprises capturing a real-time image using at least one image sensor installed on the UV, and electrically transmitting the real-time image to the manually-operated vehicle. The method further comprises displaying the real-time image captured by the UV on a graphical display of the HMI module installed on the manually-operated vehicle.

In addition to one or more of the features described above or below, or as an alternative, further embodiments include:

a feature of automatically establishing the handover communication session in response to satisfying a distance threshold between the manually-operated vehicle and the UV;

a feature of wherein the UV automatically begins capturing the real-time image and transmitting the real-time image to the manually-operated vehicle in response to establishing the handover communication session;

a feature wherein the manually-operated vehicle is a manually-operated aerial vehicle and the UV is an unmanned aerial vehicle;

a feature wherein the point of interest is a landing area or evacuation area of the unmanned aerial vehicle;

a feature wherein the unmanned aerial vehicle automatically navigates to the point of interest in response to establishing the handover communication session;

a feature wherein the unmanned aerial vehicle continuously traverses about a flight path above the point of interest area while transmitting the real-time image to the manually-operated aerial vehicle in response to reaching the point of interest; and a feature of displaying the real-time image of the point of interest on the graphical display unit before the manually-operated vehicle arrives at the point of interest.

Various non-limiting embodiments of the invention provide one or more technical effects including, for example, providing crew members of manually-operated vehicles visual access to interested areas of a battlefield that are beyond the line of sight of the crew members' eyes and existing sensors of the manually-operated vehicle. Accordingly, the crew members' viewpoint and situational awareness are enhanced beyond what is traditionally realized. Another technical effect includes that capability of providing one or more predefined automated modes that will automatically control the point of view of an unmanned vehicle (UV) visual sensor. The crew members, therefore, are alleviated from the mentally saturating task of having to constantly control and command operation of the UV. In this manner, the crew members can focus attention on check points and other mission goals without the need to continuously monitor and control the UV.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

As used herein, the term module refers to a hardware module including an Application Specific Integrated Circuit (ASIC), an electronic circuit, a processor (shared, dedicated, or group) and memory that execute one or more software or firmware programs, a combinational logic circuit, and/or other suitable components that provide the described functionality.

A human machine interface (HMI) system is provided to integrate remotely located unmanned vehicle (UV) imaging into the cockpit of manually-operated vehicles. The UV imaging enhances the vision of crew members beyond what is conventionally realized. In this manner, crew members are provided enhanced visual access to points of interest such as, for example, landing/evacuation zones.

Figure 1:
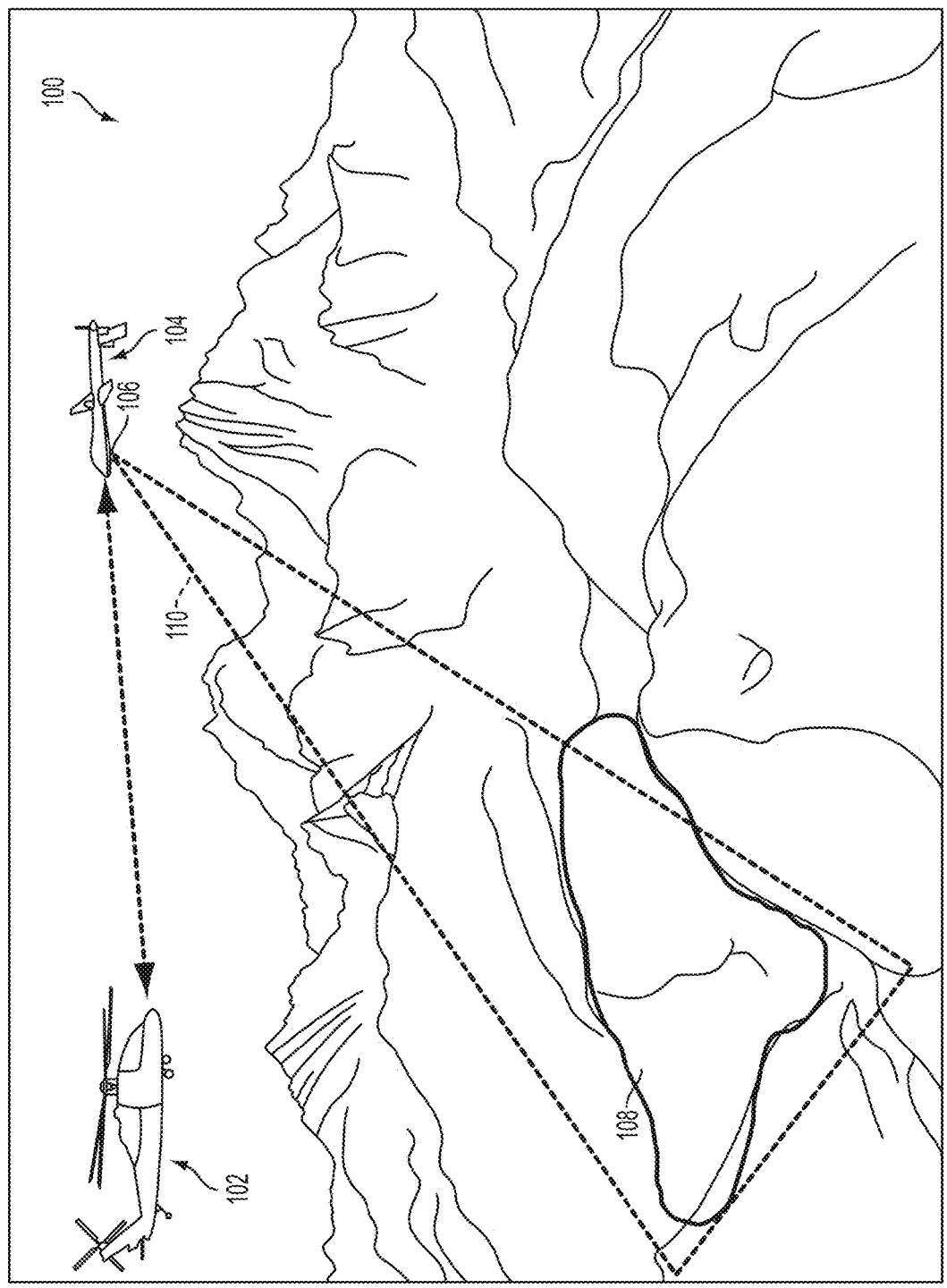
FIG. 1 is a block diagram of a human machine interface (HMI) system according to a non-limiting embodiment.

With respect to FIG. 1, a block diagram of a human machine interface (HMI) system 100 according to a non-limiting embodiment. The human machine interface (HMI) system 100 includes manually-operated vehicle 102 in signal communication with an unmanned vehicle (UV) 104. The UV 104 includes one or more image sensors 106 such as, for example, a video camera. The sensor 106 has a field of view (FOV) 110 and is configured to capture a point of interest 108 such as a landing or evacuation zone, for example, of the manually-operated vehicle 102.

The manually-operated vehicle 102 and the UV 104 are configured to establish a handover communication session between one another. According to a non-limiting embodiment, the UV 104 electrically communicates a real-time captured image of the point of interest 108 via a wireless data connection such as, for example, a tactical data link. In this manner, crew members of manually-operated vehicle 102 have visual access of the point of interest 108 thereby extending beyond the line of sight of the crew members' eyes and conventional sensors of the manually-operated vehicle 102.

Figure 2A:
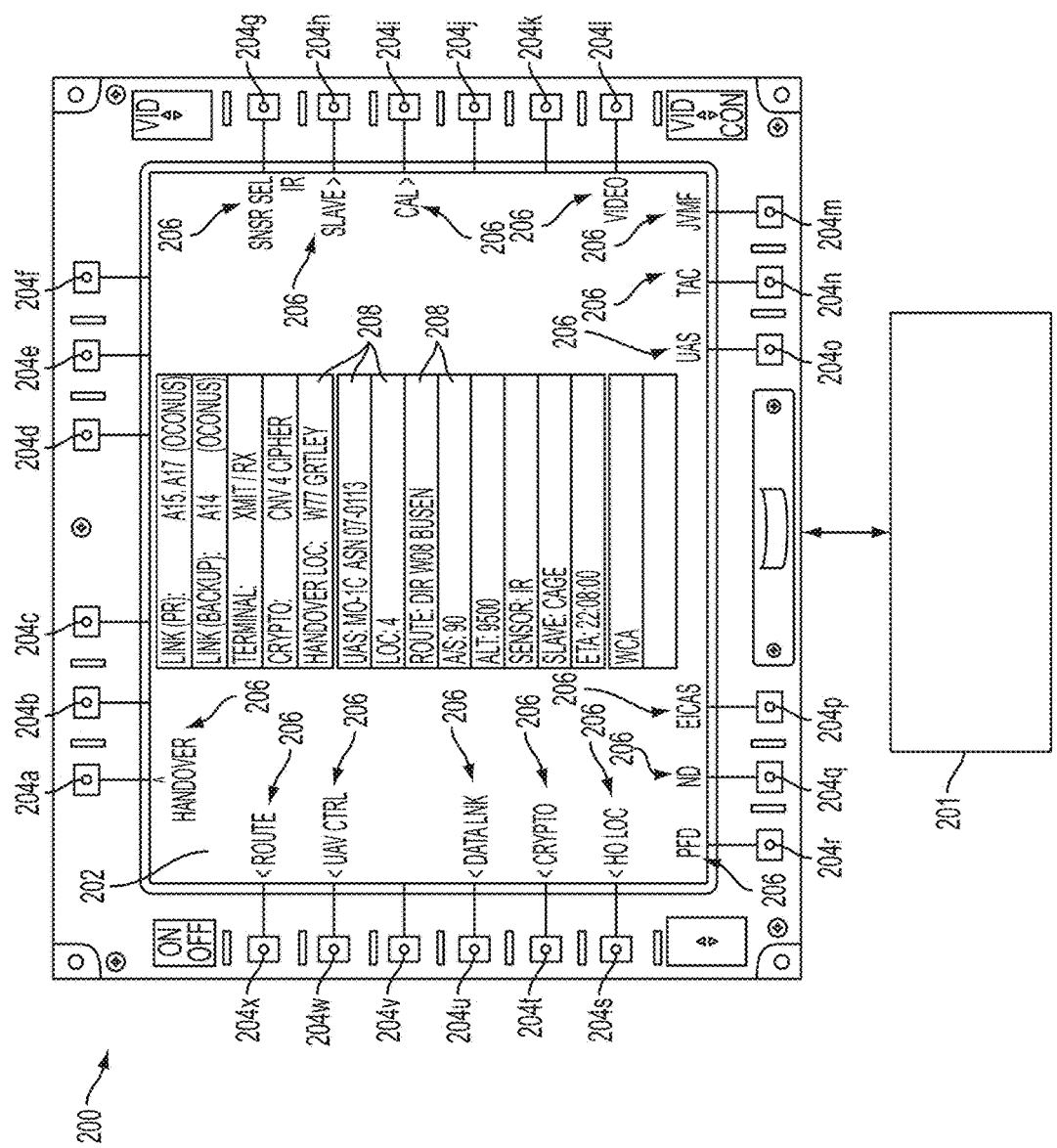
FIG. 2A is an electronic HMI included in an HMI system operating in crew setup mode according to a non-limiting embodiment.
Figure 2B:
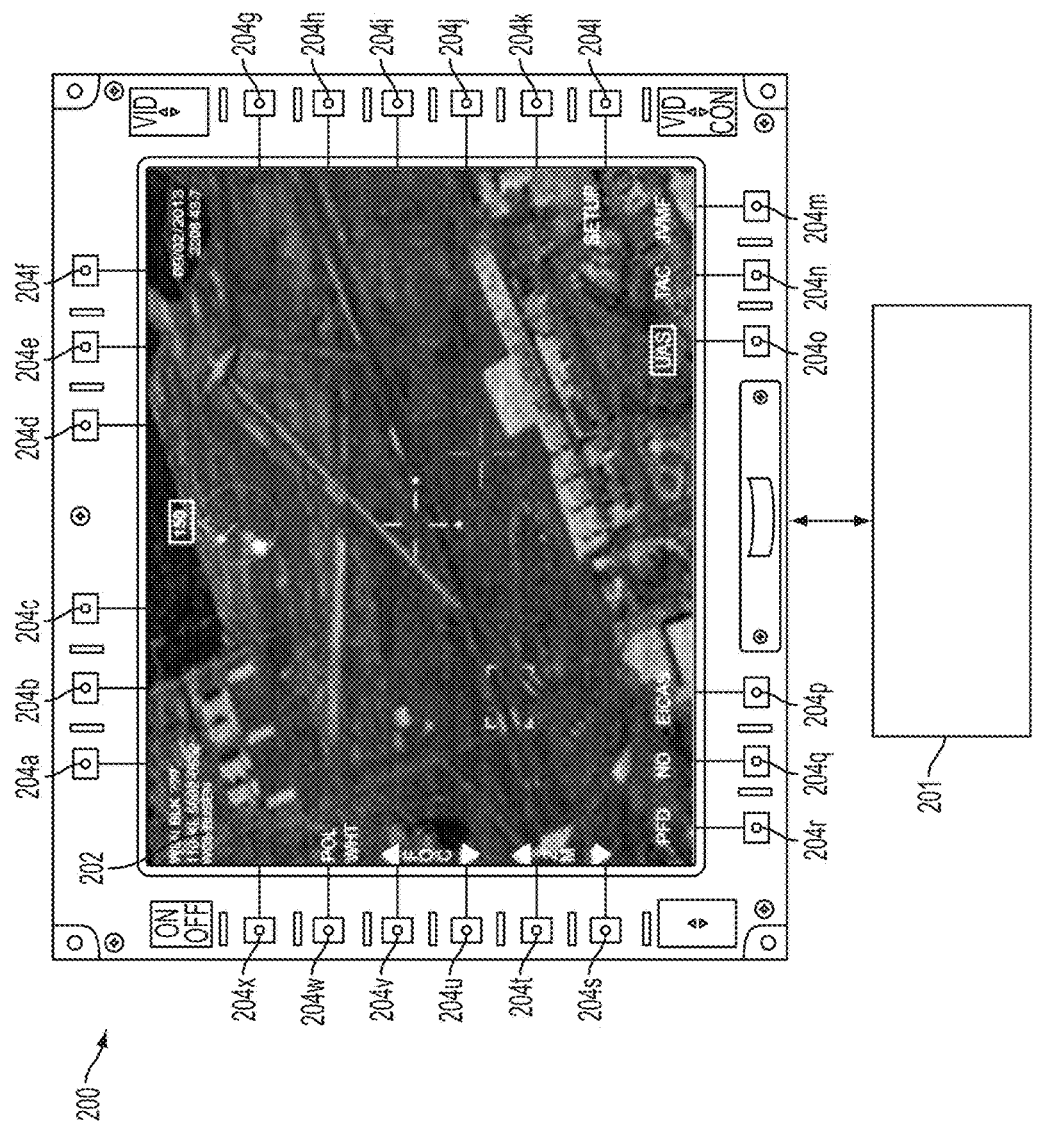
FIG. 2B is an electronic HMI included in an HMI system operating in a UV imaging mode according to a non-limiting embodiment.

Turning now to FIGS. 2A-2B, an electronic HMI module 200 included in a manually-operated vehicle 102 is illustrated according to a non-limiting embodiment. The HMI module 200 is configured to operate in a plurality of operating modes as discussed in greater detail below. The HMI module 200 includes an electronic graphical display unit 202 and a plurality of input selectors 204a-204x. The HMI module 200 is in signal communication with an electronic control module 201, which receives inputs from the input selectors 204a-204x and controls the graphical display unit 202 based on the inputs, the flight status of the manually-operated vehicle 102 and/or a status of the handover communication session between the manually-operated vehicle 102 and the UV 104.

The graphical display 202 can be formed as a liquid crystal display (LCD), for example. The graphical display 202 indicates various current operating modes of the HMI system 100. For example, the graphical display 202 indicates whether a handover communication session between the manually-operated vehicle 102 and the UV 104 has successfully occurred. The graphical display 202 also indicates various information about the handover communication session including, but not limited to, the handover location (e.g., GPS coordinates of where the handover will take place), and the estimated time of arriving at the handover location and/or point of interest 108. The graphical display 202 also indicates the operating mode of one or more sensors 106 of the UV 104. For example, the graphical display 202 can indicate whether a sensor 106 is caged (i.e. stowed), or whether a sensor 106 is operating and is live. Various other information about the UV 104 itself can also be presented on the graphical display 202 including, but not limited to, the altitude/speed of the UV 104, the identity/model of the UV 104, and the current route/location of the UV 104.

The input selectors 204a-204x include various soft-key buttons 204a-204x arranged around the bezel of the graphical display 202. The soft-key buttons 204a-204x include, but are not limited to, momentary soft-key buttons, multi-state soft-key buttons, scrolling soft-key buttons, and menu soft-key buttons. The momentary soft-key buttons are configured to command a pre-designated action. The actions include, but are not limited to, actions that control a handover communication session and signal communication between the manually-operated vehicle 102 and the UV 104, control of the UV 104 once a handover communication session is successfully established, and control of one or more UV sensors 106. Control of the UV 104 includes, but is not limited to, a modifying the UV flight path, setting a loitering route of the UV 104, and executing a return to base command to instruct the UV 104 return back to an originating location. Control of the UV sensors 106 includes, but is not limited to, position of the sensor 106 to adjust the sensor FOV, sensor zoom, slave to the point of interest 108 or to the manually-operated vehicle 102, image characteristics (e.g., brightness, contrast, color), and modes of sensors 106 (e.g., infrared mode, video mode, or TV mode).

The multi-state soft-keys are configured to select a desired state of system or operating mode when there are two or more selections available. Subsequent presses of a particular multi-state soft-key toggle through various available selectable actions. The scroll soft-keys allow for scrolling up and/or down through a list of selectable actions. An initial pressing of the scroll soft-key calls the scrollable list of actions, while depressing the scroll soft-key selects the action that is displayed. The menu soft-keys buttons include one or nested menus/submenus including one or more selectable actions. Depressing the menu soft-key opens an initial menu containing various functions/selections with a nested menu/submenu. Although the input selectors 204a-204x are illustrated as soft-key buttons 204a-204x, it is appreciated that the input selectors can exist as graphical icons that determine an input in response to sensing a touch.

Referring to FIG. 2A, the HMI module 200 is illustrated operating in a crew setup mode. When operating in the crew setup mode, the graphical display 202 electronically presents the crew members with a plurality of setup indicators 206 and one or more data fields 208. The setup indicators 206 include, but are not limited to, a UV handover status, estimated time of arrival status, and UV auto-control status. The UV auto-control status is configured to command the UV 104 to automatically adjust the UV sensor 106 point of view based on predefined task criteria. In this manner, the UV auto-control mode alleviates the crew members' burden of having to constantly adjust the position of the UV 104 and/or the viewing direction of one or more UV sensors 106 with respect to an area of interest.

Turning to FIG. 2B, the HMI module 200 is illustrated operating in a UV imaging mode. The UV imaging mode displays real-time imagery captured by a UV 104 remotely located from the manually-operated vehicle 102. The UV imaging mode is initiated in response to selecting a corresponding soft-key button 204l, for example. According to at least one embodiment, the UV imaging mode can be automatically initiated in response to establishing a handover communication session between the manually-operated vehicle 102 and the UV 104.

The UV imagery displays an image according to the operating mode of a corresponding UV sensor 106. For example, the UV sensor 106 can be selected to operate in a video mode, and accordingly a real-time video stream can be electrically communicated from the UV 104 to the HMI module 200 via a forward looking infrared (FLIR) communication port, for example. According to a non-limiting embodiment, the UV imaging is sent as an encrypted data signal, which is decrypted by the HMI module 200. Various encryption/decryption methods such as may be employed as understood by one of ordinary skill in the art.

According to an embodiment, the various operations of the UV 104 can be automatically controlled in response to establishing a successful handover communication session between the manually-operated vehicle 102 and the UV 104. The handover communication session can be either manually initiated by selecting a corresponding soft-key button, e.g., 204a, or can be automatically initiated when the manually-operated vehicle 102 is within a distance threshold (e.g., approximately 15-20 nautical miles) of the UV 104. According to an embodiment, once the handover communication session is established, the UV 104 can be instructed to travel to the point of interest 108 prior to the time at which the manually-operated vehicle 102 arrives at the point of interest 108. Once the UV 104 arrives at the point of interest 108, the UV 104 can begin transmitting a real-time video of the point of interest. In this manner, the manually-operated vehicle 102 can continuously obtain an up-to-date analysis of the point of interest while traveling to the point of interest 108.

In response to establishing a handover communication session, one or more sensors 106 are automatically uncaged and initiated to capture an image (i.e. video). If the handover communication session is lost, the HMI module 200 is configured to automatically attempt to re-establish the handover communication session. When the UV 104 is in range of the point of interest 108, one or more sensors 106 can enter into a stare-down mode, which continuously monitors the point of interest 108. The stare-down mode can also be initiated immediately after establishing handover communication session, thereby providing real-time reconnaissance while traveling to the point of interest 108. The monitored image is simultaneously transmitted to the manually-operated vehicle 102. In this manner, the manually-operated vehicle 102 obtains a real-time analysis of the point of interest 108 before time of arrival. Since the handover communication session can be established when the manually-operated vehicle 102 and the UV are within a distance threshold (e.g., approximately 15-20 nautical miles), the crew members' visual assessment of the point of interest 118 can be greatly enhanced at extended distances. The HMI module 200 is also configured to transmit commands to the UV 104, which control the operation of one or more UV sensors 106 when a handover communication session is established. For example, the point of view of the UV sensors 106, zoom, and operating modes of the sensors 106 can all be controlled by crew members of the manually-operated vehicle 102 using the HMI module 200.

According to another embodiment, the electronic control module can output an autonomous operation control signal commanding the UV 104 to automatically execute various operations. For example, a loitering command can also be input into the HMI module 200 during a handover communication session. In response to inputting the loitering command, the electronic control module outputs an autonomous operation control signal that commands the UV to initiate a loitering mode. When the loitering mode is invoked, the UV 104 automatically takes up constant visual position of the point of interest 108. If the UV 104 is a UAV, for example, the UV 104 automatically circles above the point of interest 108, and continuously transmits a video feed of the point of interest 108 to the manually-operated vehicle 102. In this manner, the crew members obtain continuous real-time data while traveling to the point of interest, during mission operations at the point of interest, and when evacuating the point of interest. Accordingly, crew members can focus their attention on the goals of the mission, as opposed to being concerned with controlling the flight of the UV 104.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electronic human machine interface (HMI) module configured to receive at least one input from an operator of a manually-operated vehicle, the electronic HMI module comprising:

an electronic graphical display unit configured to display information corresponding to the manually-operated vehicle and information corresponding to an autonomously operated unmanned vehicle (UV) located remotely from the manually-operated vehicle, wherein the graphical display unit further displays at least one of a handover location associated with establishing a handover communication session and an estimated time of arriving at the handover location; and an electronic control module in signal communication with the UV, the electronic control module configured to receive an electronic image signal from the UV and to display a real-time image captured by the UV on the electronic graphical display unit based on the image signal during the handover communication session;

wherein the electronic control module is operable to establish the handover communication session between the manually-operated vehicle and the UV when the manually-operated vehicle and the UV are within a distance threshold, wherein the manually-operated vehicle continuously obtains an up-to-date analysis of a point of interest from the UV while travelling to the point of interest, the continuous up-to-date analysis being initiated in response to establishing the handover communication.

2. The electronic HMI module of claim 1, wherein the electronic control module selectively operates the electronic graphical display unit in a first mode and a second mode during the handover communication session.

3. The electronic HMI module of claim 2, wherein the graphical display unit displays an interface of selectable actions to control operation of the manually-operated vehicle and the UV when operating in the first mode, and wherein the graphical display unit displays real-time image captured by the UV when operating in the second mode.

4. The electronic HMI module of claim 3, wherein the interface of selectable actions include a first set of selectable actions to control at least one of the handover communication session and navigation of the UV, and a second set of selectable action to control operation of at least one UV image sensor installed on the UV.

5. The electronic HMI module of any one of claims 1-4, wherein the electronic control module outputs an autonomous operation control signal that commands the UV to traverse to a geographical point of interest while simultaneously transmitting the image signal to the electronic control module.

6. The electronic HMI module of claim 5, wherein the UV automatically initiates the at least one image sensor to capture the real-time image in response to establishing the handover communication session.

7. The electronic HMI module of claim 6, wherein the electronic control module receives an input commanding the at least one UV sensor to selectively output the image signal as one of an infrared image signal or a video signal.

8. A method of visually enhancing a geographical point of interest using a human machine interface (HMI) system, the method comprising:

displaying at least one of a handover location associated with establishing a handover communication session and an estimated time of arriving at the handover location on a graphical display of the HMI module installed in the manually-operated vehicle:

establishing the handover communication session to electrically communicate at least one electrical signal between a manually-operated vehicle and an autonomously operated unmanned vehicle (UV) located remotely from the manually-operated vehicle when the manually-operated vehicle and the UV are within a distance threshold;

automatically navigating the UV to a point of interest designated using an electronic HMI module installed on the manually-operated vehicle;

capturing a real-time image of the point of interest using at least one image sensor installed on the UV, and electrically transmitting the real-time image to the manually-operated vehicle wherein the manually-operated vehicle continuously obtains an up-to-date analysis of the point of interest from the UV while travelling to the point of interest, the continuous up-to-date analysis being initiated in response to establishing the handover communication; and displaying the real-time image captured by the UV on the graphical display.

9. The method of claim 8, further comprising automatically establishing the handover communication session in response to satisfying the distance threshold between the manually-operated vehicle and the UV.

10. The method of claim 9, wherein the UV automatically begins capturing the real-time image and transmitting the real-time image to the manually-operated vehicle in response to establishing the handover communication session.

11. The method of claim 8, wherein the manually-operated vehicle is a manually-operated aerial vehicle and the UV is an unmanned aerial vehicle.

12. The method of claim 11, wherein the point of interest is a landing area or evacuation area of the unmanned aerial vehicle.

13. The method of claim 12, wherein the unmanned aerial vehicle automatically navigates to the point of interest in response to establishing the handover communication session.

14. The method of claim 13, wherein the unmanned aerial vehicle continuously traverses about a flight path above the point of interest area while transmitting the real-time image to the manually-operated aerial vehicle in response to reaching the point of interest.

15. The method of claim 14, further comprising displaying the real-time image of the point of interest on the graphical display unit before the manually-operated vehicle arrives at the point of interest.

* * * * *